April 25, 1933.                    R. H. BACON                     1,905,361
CHECK VALVE FOR RUBBER BALLS
Filed July 1, 1929
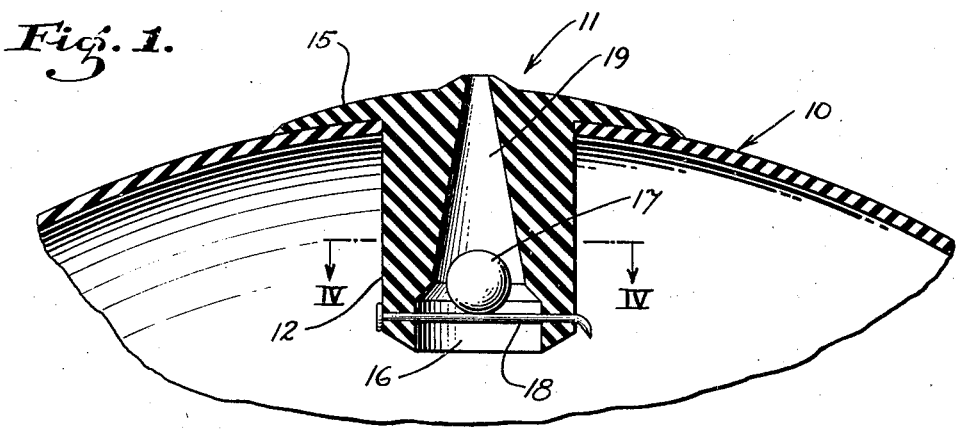
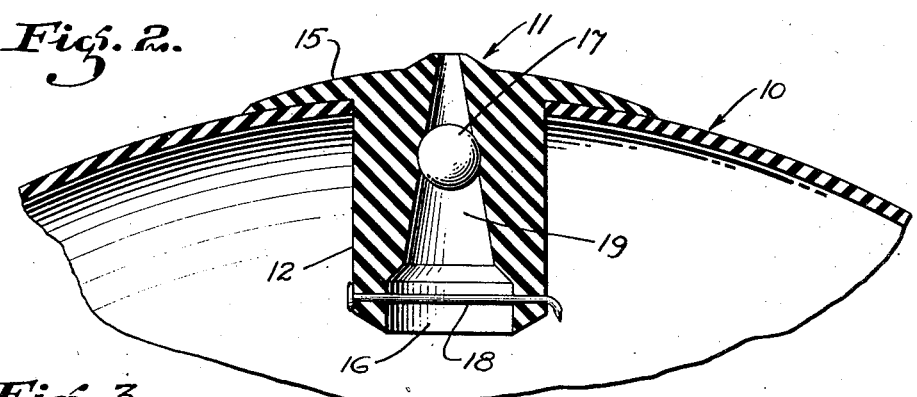
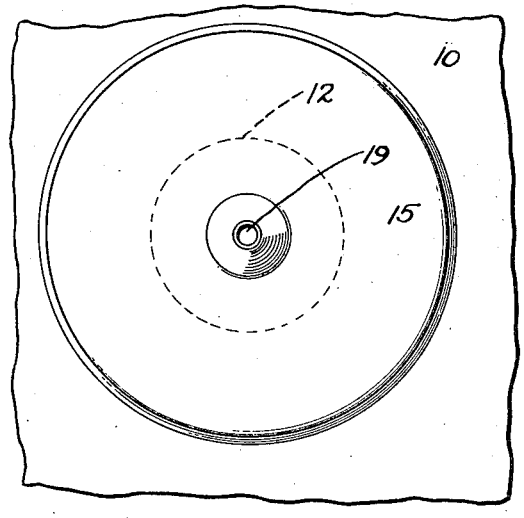
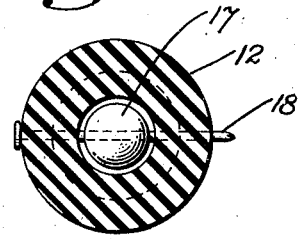
INVENTOR.
Robert H. Bacon.
BY Townsend, Loftus & Affett
ATTORNEYS.

Patented Apr. 25, 1933

1,905,361

UNITED STATES PATENT OFFICE

ROBERT H. BACON, OF OAKLAND, CALIFORNIA

CHECK VALVE FOR RUBBER BALLS

Application filed July 1, 1929. Serial No. 375,148.

This invention relates to inflated balls provided for the amusement of children.

It is the principal object of the present invention to provide a simple and inexpensive check valve structure which may be assembled and then vulcanized into place directly on the ball, which check valve structure is so constructed that an air-tight seal may be effected under comparatively low pressures.

In carrying out this object into practice, I provide a check valve cage formed of rubber and cylindrical in cross section. The ball is formed with an opening through which this cylindrical cage may be projected. At the upper end of the cage it is provided with a circumscribing flange of a diameter larger than the opening, which flange is vulcanized directly onto the ball surrounding the opening. The valve cage is formed with a valve chamber within which is disposed a ball valve. A tapered passageway extends from the valve chamber through the outer end of the cage. This passageway converges so that it will co-operate with the ball in forming an air-tight seal to prevent leakage of the air from the ball to the atmosphere.

One form which the invention may assume is exemplified in the following description and illustrated by way of example in the accompanying drawing, in which:

Fig. 1 is a fragmentary view in section through a ball disclosing my improved check valve structure mounted thereon.

Fig. 2 is a view similar to Fig. 1, with the exception that the ball valve is shown as preventing the escape of air pressure from the interior of the ball to the atmosphere.

Fig. 3 is a fragmentary view of the ball showing by improved valve structure in place.

Fig. 4 is a transverse sectional view through the check valve cage taken on line IV—IV of Fig. 1.

Referring more particularly to the accompanying drawing, 10 designates the spherical wall of a large rubber ball; 11 indicates my improved valve structure which includes a cylindrical valve cage 12 which projects through an opening 14 formed in the wall 10 of the ball. At its outer end the cylindrical valve cage 14 is formed with a circumscribing flange 15. The valve cage and its flange 15 are preferably formed of rubber and the flange 15 is vulcanized directly to the wall 10 of the ball. It will be noticed that the flange 15 is of a diameter considerably greater than the diameter of the opening 14, through which the cylindrical portion 12 of the valve cage extends.

Extending from the upper end of the chamber through the outer end of the valve cage 12 is a tapered passageway 19. The lower end of this passageway is of a diameter slightly greater than the diameter of the ball valve 17. The outer end of the passageway 19, is, however, somewhat smaller in diameter than the diameter of the ball valve 17. The passageway 19 and the ball valve 17 co-operate in forming an air-tight seal to retain the air pressure within the ball 10. The valve cage 12 is formed entirely of rubber and when the ball valve 17 is pressed outwardly in the passageway 19, it becomes slightly embedded at its sides in the walls of the passageway, as shown in Fig. 2, forming a perfectly air-tight seal to prevent the escape of pressure from the ball. Although the pressure in the ball may not be great enough to so position the ball valve 17, I have found that, by giving a slight rap to the ball in the area of the valve structure, the ball will force itself outwardly in the passageway 19 to a firm seat.

In operation of the device, an opening 14 of the proper dimension is formed through the wall of the ball 10 and the cylindrical valve cage 12 is projected therethrough. The circumscribing flange 15 of the cage is then vulcanized to the ball. Air may then be inserted through the passageway 19 to properly inflate the ball. It is obvious that the ball valve will permit the ball to be inflated. When the ball has been properly inflated, the pressure will cause the ball valve 17 to seat. The ball is then rapped slightly in the area of the valve cage until the ball valve 17 seats firmly in the passageway 19, slightly embedding itself in the walls of the passageway 19. This will form a perfectly air-tight seal to prevent the escape of pressure from the ball.

I desire to point out that the air pressure in the ball is comparatively low, but that I have provided a valve structure capable of forming an air-tight seal regardless of the differential in air pressure between the interior of the ball and the atmosphere.

While I have shown the preferred form of my invention, it is to be understood that various changes may be made in its construction by those skilled in the art without departing from the spirit of the invention as defined in the appended claims.

Having thus described my invention, I claim as new and desire to secure by Letters Patent of the United States the following:

1. A check valve structure including a valve body formed of resilient material, a tapered valve chamber extending through the valve body, a ball valve in the chamber, the lower end of said chamber being of a diameter greater than the diameter of the ball valve, the upper end of said chamber being of a diameter smaller than the diameter of the ball valve, the chamber being so gradually tapered that the ball valve may embed itself in the walls of the chamber and be held in place by the resiliency of the walls.

2. In combination with a ball having a rubber wall with an opening formed therethrough, a cylindrical valve body formed of rubber and insertable through said opening, a circumscribing flange formed about the outer end of said valve body, said flange being of a diameter greater than the opening, said flange being vulcanized to the ball about said opening, the inner end of said valve body being formed with a valve chamber, a ball valve disposed in said chamber, said chamber being tapered and formed in the valve body concentrically of the chamber and extending longitudinally through the said valve body, the diameter of the inner end of said chamber being larger than the diameter of the ball, the diameter of the outer end of said chamber being less than the diameter of the ball, the walls of said chamber being resilient, said chamber being so gradually tapered that the ball may embed itself in the walls of the chamber and be held in place by the resiliency of the walls.

3. The combination with a ball formed of rubber and having an opening therein, of a resilient valve body formed of rubber insertable through said opening co-axially thereof, a flange circumscribing the outer end of said valve body, said flange being formed of rubber and integral with the valve body, a diameter of the flange being greater than the diameter of the opening, said flange tapering in thickness toward its periphery, said flange being vulcanized to the ball about said opening, a valve chamber formed longitudinally through the valve body, a ball valve therein, a pin extending transversely through the chamber at its inner end to retain the ball valve in said chamber, said chamber being tapered, the diameter of the inner end of the chamber being greater than the diameter of the ball valve, the diameter of the outer end of the chamber being less than the diameter of the ball valve, whereby said ball valve may be forced upwardly into the chamber and due to the inherent resiliency of the valve body embed itself in the walls of the passageway and thereby form an air-tight seal.

4. In a check valve of the character described, a valve body of highly resilient relatively soft material, said body having a valve chamber of elongated tapered contour formed therein and a ball in said chamber adapted to seat against and become embedded in the walls thereof, the taper of said valve chamber being so gradual that said ball may embed itself in the walls of the chamber and be held in place by the resiliency of the walls.

5. In a check valve of the character described, a valve body of highly resilient relatively soft material, said body having a valve chamber of elongated conical contour formed therein, a ball in said chamber adapted to seat against and become embedded in the walls thereof, and a pin piercing the valve body and extending through the large end of the valve chamber to retain the ball against removal from the chamber.

ROBERT H. BACON.